United States Patent
Ho et al.

(10) Patent No.: US 10,282,451 B1
(45) Date of Patent: May 7, 2019

(54) CONTEXT AWARE APPLICATION MANAGER

(71) Applicant: Twitter, Inc., San Francisco, CA (US)

(72) Inventors: Edward Ho, Palo Alto, CA (US);
Gordon Luk, Cupertino, CA (US);
Todd Jackson, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 379 days.

(21) Appl. No.: 14/499,083

(22) Filed: Sep. 26, 2014

Related U.S. Application Data

(60) Provisional application No. 61/883,128, filed on Sep. 26, 2013.

(51) Int. Cl.
*G06F 17/30* (2006.01)

(52) U.S. Cl.
CPC ................ *G06F 17/3053* (2013.01)

(58) Field of Classification Search
CPC .................................................. G06F 17/3053
See application file for complete search history.

(56) References Cited

U.S. PATENT DOCUMENTS

| | | | |
|---|---|---|---|
| 9,798,443 B1 | 10/2017 | Gray | |
| 2005/0268301 A1 | 12/2005 | Kelley et al. | |
| 2008/0248815 A1* | 10/2008 | Busch | H04W 4/029 455/456.5 |
| 2010/0295805 A1 | 11/2010 | Shin et al. | |
| 2011/0175930 A1 | 7/2011 | Hwang et al. | |
| 2011/0258582 A1 | 10/2011 | Bang et al. | |
| 2013/0145295 A1 | 6/2013 | Bocking et al. | |
| 2013/0155116 A1 | 6/2013 | Paretti et al. | |
| 2013/0191397 A1* | 7/2013 | Avadhanam | G06F 17/3053 707/748 |
| 2013/0205366 A1* | 8/2013 | Luna | H04L 63/101 726/1 |
| 2013/0246970 A1 | 9/2013 | Helle | |
| 2013/0267209 A1* | 10/2013 | Bott | H04W 4/16 455/414.1 |
| 2013/0326583 A1 | 12/2013 | Freihold et al. | |
| 2014/0006517 A1* | 1/2014 | Hsiao | G06Q 50/01 709/205 |
| 2014/0137020 A1 | 5/2014 | Sharma et al. | |
| 2014/0189592 A1 | 7/2014 | Benchenaa et al. | |

* cited by examiner

*Primary Examiner* — Huawen A Peng
(74) *Attorney, Agent, or Firm* — Brake Hughes Bellermann LLP

(57) ABSTRACT

A method of managing a display of applications on a computing device can include identifying a plurality of contexts in which the computing device is used, each context being associated with (i) one or more signals and (ii) a plurality of applications. The method can also include detecting at least a subset of the signals during usage of the computing device and determining, based on the detected signals, that the computing devices is being used within a first context. The method can further include ranking, based on usage of the computing device, the applications associated with the first context. The method can still further include displaying, based on the ranking, representations of a first subset of the applications associated with the first context on a display of the computing device.

36 Claims, 9 Drawing Sheets

CONTEXT AWARE APPLICATION MANAGER

CROSS-REFERENCE TO RELATED APPLICATIONS

This application claims the benefit of U.S. Provisional Application No. 61/883,134, titled "OVERLAY USER INTERFACE", filed on Sep. 26, 2013, and U.S. Provisional Application No. 61/883,128, titled "RANKING OF APPLICATIONS", filed on Sep. 26, 2013, the disclosures of which are incorporated by reference herein in their entirety. This application is also related to U.S. application Ser. No. 14/499,077, titled "OVERLAY USER INTERFACE", filed on Sep. 26, 2014, the disclosure of which is incorporated by reference.

TECHNICAL FIELD

This disclosure generally relates to the ranking and display of applications on a computing device.

BACKGROUND

The use of computing devices has greatly increased in recent years. Computing devices such as tablet computers, smart phones, cellular phones, and netbook computers, are now commonplace throughout society. Computing devices also exist with other devices, such as, for example, cars, planes, household appliances, and thermostats. With this increase in the number of computing devices, the number of applications has also greatly increased. Software developers have created new applications to meet the varying needs and requirements of users. For example, map applications allow users to navigate from one location to another, game application allow users to play video games on their computing device, social networking applications allow users to connect to a social network to post/share content, a calorie tracking application may allow users to track the amount of calories are in the food the users eat, etc.

On a computing device (e.g., a tablet, a smart phone, a laptop computer a PDA, etc.) applications can be represented by a visual icon that is displayed by the computing device. Selecting the icon (e.g., by tapping or double tapping the icon) can launch the application for use by the user. A user may often have so many applications installed on a computing device that the icons representing the applications do not fit on a single page of the display of the computing device.

Although users have a multitude of applications, most users do not spend a lot of time or effort organizing the icons that represent their applications. As a user installs different applications onto a computing device, the computing device may automatically arrange icons for the applications in the order in which they were downloaded and/or installed. Because users may not organize their applications, it may be hard for users to access applications easily and/or quickly when they need to. This may be frustrating to users, who often open different applications tens, or hundreds, of times per day. In addition, switching between different applications tens, or hundreds, of times per day, and going through the process of locating an application, launching the application, closing the application, locating another application, launching the other application, etc. may be irritating to a user, especially when the user may interact with an application for only a few seconds before moving on to another application.

SUMMARY

In general, this disclosure pertains to systems and methods of ranking applications on a computing device such as a smartphone, a mobile phone, a cellular phone, a tablet computer, a touchscreen device, a personal digital assistant (PDA), etc. The application ranking system may analyze which applications the user opens in various different contexts (e.g., various times of the day, various locations, various activities, etc.), and may allow the user to more easily access these applications via a user interface (for example via the lock screen of the computing device).

As the user continues to use the computing device, the app ranking system may analyze the applications that are accessed (e.g., used) by the user and the context in which the user uses the applications (e.g., the time of day, the location, etc.). The app ranking system may continually identify applications that a user is likely to access during different contexts and may present these applications to the user for easier and faster access.

According to one general aspect, a method of managing a display of applications on a computing device can include identifying a plurality of contexts in which the computing device is used, each context being associated with (i) one or more signals and (ii) a plurality of applications. The method can also include detecting at least a subset of the signals during usage of the computing device and determining, based on the detected signals, that the computing devices is being used within a first context. The method can further include ranking, based on usage of the computing device, the applications associated with the first context and displaying, based on the ranking, representations of a first subset of the applications associated with the first context on a display of the computing device.

Implementations can include one or more of the following features. For instance, the method can include determining, based on the detected signals, that that the computing device is being used within a second context. The method can include ranking, based on usage of the computing device, the applications associated with the second context, where the ranking is based at least on the correlation between the use of the application within the second context. The method can include displaying, based on the ranking, representations of a second subset of the applications associated with the second context on the display of the computing device.

The plurality of signals can include a determined location of the computing device. The plurality of signals can include a time at which the computing device is used. The plurality of signals can include an indication of another device to which the computing device is functionally connected.

The method can include correlating usage of applications on the computing device with individual signals. Identifying the plurality of contexts can be based at least the correlation. Identifying the plurality of contexts can include identifying a number of contexts and wherein the number of contexts is determined based at least in part on input from a user about the number of contexts to identify.

The method can include ranking an application that has not been used previously on the computing device. The ranking can be based on a relevance, when the computing device is being used within the first context, of the application that has not been used previously on the computing device. Based on the ranking, the application can be associated with the first context. The display of the representations of the first subset of the applications can include a representation of the application that has not been used previously.

The method can include changing the rankings of the applications based on how long the computing device has been used within the first context. The ranking of the applications can remain fixed while the computing device is used within the first context. Displaying the representations of the first subset of the applications can include displaying, in association with a representation of one of the displayed applications, a notification of a number of new events associated with the application. The method can include determining a threshold for new events to be associated with the application, wherein the determination of the threshold is based on the determination that the computing device is being used the first context.

The method can include, based on the determination that the computing device is being used within the first context, selecting a contact of a user of the computing device for association with a displayed representation of an application. The method can include displaying a representation of the contact in association with the representation of the application. The method can include, based on the determination that the computing device is being used within the first context, pre-populating an input to the application whose representation is displayed in association with the representation of the contact.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
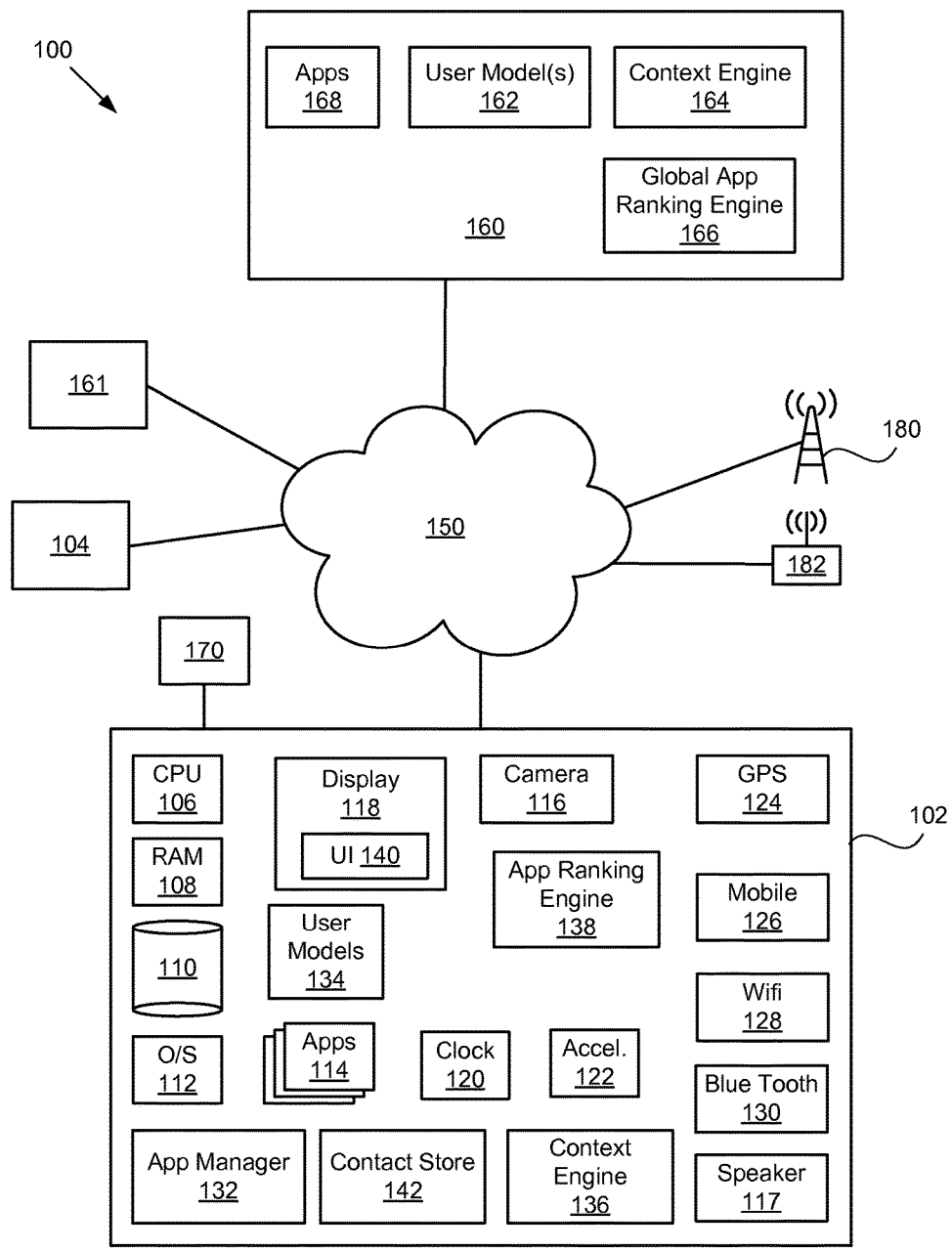
FIG. 1 is a schematic diagram of a system for a context-based ranking of applications on a computing device.

Techniques are disclosed herein for customizing display of applications in a computing device. One or more different contexts corresponding to signals of a computing device can be defined or identified. In one or more embodiments, a context is a data structure corresponding to (i) one or more signals received or identified by the device and (ii) one or more applications. For example, it may be determined that the computing device is used in a work context, in a home context, in a "driving" context, or in other contexts. The identification of a context can be based at least in part on signals depicting how a user of the computing device utilizes applications on the computing device. For example, use of a first group of applications at regular time intervals, in particular locations, or when the computing device is in a particular state (e.g., connected to headphones, in motion, moving more than 10 mph, etc.) that is different from other groups of applications that are used in other times, locations, or in different states the device may indicate a particular context for the device.

A "current context" of a computing device can refer to a context selected based on a current state of the device. The current context may be selected by identifying one or more signals of the device that match signals of the context. By analyzing the current context of the computing device, an application ranking system may be able to identify applications that a user is likely to use during a current context. For example, when the computing device is determined to be used in a particular context, applications loaded on the computing device can be ranked for that particular context, where the ranking is based on the value or relevance to a user of the computing device within the particular context. Then, a subset of applications loaded on the computing device can be displayed to the user on a display page of the computing device (e.g., a "home page" or a "lock screen" or of an "overlay user interface page" of the computing device). Thus, applications that are especially relevant to a user can be surfaced to the user when the device is determined to be in a particular context. In this manner, a user can spend less time searching for, or navigating to, applications that the user may want to use within particular contexts.

The techniques described herein allow a computing device to present applications, or application icons, to the user in a dynamic fashion depending on the context of the computing device. Different applications may be presented to the user based on the context of the computing device. The applications may be ranked and displayed based on the likelihood of the user wanting to use them/access them quickly, given the context of the computing device (e.g., based on specific circumstances, environment, and/or state inputs). These rankings for a context can be periodically regenerated, so display of applications on the computing device is dynamic and so that the computing device may "learn" from how the user uses the computing device. This may allow the computing device to more accurately personalize the application list to the user. Users may also access applications without needing to manually categorize or classify applications for different purposes or contexts. Application may be ranked differently for each user and/or set of context(s). For example, one user's "work applications," which are displayed when the user in a work context, may include social network applications or games, whereas another user's work applications may include email applications.

FIG. 1 is a schematic diagram of a system 100 for a context-based ranking of applications on a computing device, which can be a mobile computing device (e.g., a smart phone, a PDA, a tablet, a wearable device, such as, a wrist mounted device, or a laptop computer). System 100 can include one or more computing devices 102, 104, one or more server computers 160, 161 that are connected to the client device(s) through one or more networks 150. The client device 102 can include one or more processors (e.g., including a central processing unit, a graphics processor, etc.), a volatile memory 108, and nonvolatile memory 110. In various implementations, the volatile memory 108 may store, for example, instructions that are executed by the processor(s) 106, and the nonvolatile memory 110 may store, for example, various user data, instructions for executing an operating system, applications, etc.

The computing device 102 can include an operating system 112 and a plurality of applications 114, which can be executed by the computing device 102 (e.g., by the processor 106 executing one or more instructions stored in memory 108 that correspond to the application) and which may communicate with the operating system (e.g., through one or more application programming interfaces (APIs)). Execution of the applications 114 can provide various functionality to a user of the computing device 102. In a few examples, an email application may provide access to the user's email account and email messages associated with the account. A browser application may provide a web browser to a user, so that the user may access content that can be loaded into, and displayed by, the browser application. A navigation application can provide access to maps, can provide routing instructions for navigating from one place to another place, and can provide traffic information associated with the routing instructions, etc. A weather application can provide information about current weather conditions and weather forecasts for various locations. A social network application can provide content to the user from contacts and sources that the user has chosen to be associated with within the social network application. A music application can provide access to songs and other audio files that the user has associated with his or her account with the music application. A camera application can provide access to use of a camera 116 within the computing device 102. A video streaming application can provide access to video content (e.g., movies, television shows, etc.) that is available from a provider of the video streaming application to a user of the computing device 102. Applications that provide a rich variety of other functionalities and information to the user also can be provided.

The computing device 102 includes a display 118 (e.g., a touchscreen display) that can display an application 114 that is being executed by the device. More than one application can be executed at a time. However, in some implementations (e.g., in the case of a smart phone), the size of the display is better suited for a single executing application to be displayed at a time. The executing application that is displayed on the display 118 can be referred to as a "front-facing" application.

The computing device 102 can include internal speakers 117 that can provide an audio output from the device. The computing device 102 also can include a port (not shown) that can be used to connect the computing device to external devices, e.g., speakers that may provide an audio output when connected to the device 102.

The computing device also includes a clock 120 that determines a time and date, an accelerometer 122 that determines an acceleration of the computing device through space, and a GPS transceiver 124 that communicates with a global positioning system to determine a location of the computing device 102. The computing device 102 also includes various network interface circuitry, such as for example, a mobile network interface 126 through which the computing device can communicate with a cellular network, a Wi-Fi network interface 128 with which the computing device can communicate with a Wi-Fi base station 182, and a Bluetooth network interface 130 with which the computing device can communicate with other Bluetooth devices. The computing device 102 may include other sensors (not shown), such as, for example, an ambient light sensor, a microphone that detects sound in the environment of the device, a temperature sensor, etc.

An application management engine 132 can monitor the use of different applications 114 on the computing device 102 and can correlate the use of the applications with one or more signals associated with, or available to, the computing device 102 build up one or more models of user behavior associated with use of the applications 114. Signals can include data generated by, detected by, and/or provided to the device. Signals can depict operation of the device, how the device is used, or a state of the device. For example, use of an application 114 can be correlated with a time signal from the clock 120 (e.g., a time of day, day of week, holiday versus workday). The application management engine 132 can monitor the use of an application and can correlate the use of the application with the computing device 102 being in a particular location (e.g. as determined by the GPS 124, location information available through the mobile network interface 126 which may include information about a location of a cellular tower 180 with which the mobile network interface is communicating, location information about a Wi-Fi base station 182 with which the Wi-Fi network interface 128 communicates, etc.).

In another example, the application management engine 132 can correlate use of an application 114 with the computing device 102 being in a particular state. Examples of states of the computing device 102 can include, for example, the state of being connected to an external device, states associated with motion of the computing device 102, etc. For example, a state of the computing device 102 can be determined based on the computing device being connected to an external headphone or speaker, e.g., through a cord that is plugged into the computing device or through pairing with a wireless speaker system. In another example, a state of the computing device can be determined based on the computing device being paired (e.g., over a Bluetooth connection) with an audio system of a car, which may indicate that a user of the computing device is driving in a car. In another example, the state of the computing device can be determined based on a computing device being paired with a large display system (e.g., a television), which may indicate that a user of the device is watching television. In another example, a state of the computing device can be determined based on an indication of motion of the device, which may be determined based on information received from the accelerometer 122. In some implementations, the use of the application 114 can be correlated with motion of the computing device that is determined to indicate driving in a car or that indicates a user of the device is walking.

Other signals that can be correlated with the user of an application 114 can include Wi-Fi signal strength (an indicator of how far the computing device is from certain base stations, in order to identify different indoor locations such as a kitchen vs. a living room vs. a bedroom), cellular signal strength (which may be used to determine the location of the computing device or whether the computing device is inside a building or outside of a building), ambient light level, ambient sound level, whether the phone has any active universal serial bus (USB) connections (which may indicate that the computing device is charging), which applications are running on the device, which applications are front-facing, the manner in which an application was launched and/or accessed (e.g., from the lock screen or from an application menu or user interface), etc.

Based on the monitored use of different applications 114 and the correlation of the use with one or more signals available to the computing device 102, a user model 134 can be generated. The user model may include, or be based on, a history launches and uses of applications (e.g., including when the applications were front facing, when the applications were opened, and when the applications were fully closed), along with the one or more signals that are available to the computing device and that may be correlated with application use.

A context engine 136 may determine different contexts based on the user model 134. Contexts may also be associated with the application run history of the user (e.g., a history of applications accessed by the user) in addition to the other records. The context(s) and the times and/or locations when the computing device transitions to different context(s) may be also be recorded by the context engine. Although a "context," as used by the computing device, includes particular data that can be used to provide a context-aware ranking of applications available for execution on the computing device, a context can be mapped to real-world situations that make sense to a user. For example, contexts can be mapped to "Home," "Work," "Vehicle," situations in which the user utilizes of the computing device.

In some implementations, the context engine 136 can use a machine learning approach to determine one or more contexts based on the user model and the monitored use of the applications in relation to the various signals with which the use of the applications is correlated. For example, if use of a group of applications A, B, C is highly correlated with signals 1, 2, 3 but not with signals 4, 5, 6, and a group of applications D, E, F, is highly correlated with signals 4, 5, 6 but not with signals 1, 2, 3, then the context engine 136 may determine that the computing device 102 is in a first context when all, or at least one of, signals 1, 2, 3 are present, and that the computing device 102 is in a second context when all, or at least one of, signals 4, 5, 6 are present.

In some implementations, the context engine 136 can determine different contexts based on particular signals. For example, the context engine 136 can determine different contexts based on times of the day or locations. Thus, different contexts can be determined based on the usage of different applications at different times of the day or different contexts can be determined based on the usage of different applications when the computing device is at different locations. Some of the signals may be predetermined to be reliable indicators of a relevant context in which a user is likely to use the computing device.

In some implementations, the context engine 136 can receive input from a user of the computing device 102 regarding the granularity with which different contexts should be determined. For example, the user may indicate to the context engine 136 that only two different contexts should be determined, that up to a predetermined number (e.g., five) of different contexts should be determined, or that different contexts should not be determined at all. Thus, a user who values the use of different contexts may specify that more contexts should be determined than a user who does not value the use of different contexts or who finds them confusing.

In some implementations, a user of the computing device can provide input to the context engine 136 to assist the context engine in determining one or more contexts. For example, the user may provide input to the computing device (e.g., through a voice command, through text input, or through input to a graphical user interface on the display 118) to indicate that the computing device 102 should use a particular context. Then, the context engine 136 may examine the signals that are present when the user provides such input and then can use the present signals to determine the particular context.

The context(s) determined by the context engine 136 may not be mutually exclusive. For example, different contexts may be combined together or may be arranged and/or combined in a hierarchical or overlapping fashion.

An application ranking engine 138 may perform a context-dependent ranking of applications 114 that exist for use on the computing device. For example, for each application 114 on the computing device 102, the application ranking engine 138 may determine a probability that the user will access the application in the current context of the user/computing device. For example, when the context engine 136 has determined that a particular context is indicated by use of the computing device 102 when the computing device is in a moving vehicle, then, for each application on the computing device, the application ranking engine 138 may determine a probability that the user will access an application while the user is in a moving vehicle. Based on these probabilities, the application ranking system may identify a set of applications that the user is likely to access or use within this context and/or an ordered list of applications that the user is likely to access (e.g., the applications that have higher probabilities of being accessed given the device's current state or context would appear higher in the ordered list).

In one embodiment, the application ranking engine 138 may use a naïve Bayes formula when determining the probability that an application will be accessed (e.g., initiated and/or resumed) by the user in the current context. For example, as illustrated in the pseudo-code of TABLE 1 below, the probability that an application may be accessed by a user may be determined by calculating a Bayesian score for each application given the current context.

TABLE 1

Bayesian Score

We are trying to get P(App|Context)
Where a Context includes signals (e.g., day, time, cellid, wifi, headphones connected, motion of device, etc.)

$$P(App \mid Context) = \frac{P(Context \mid App) \cdot P(App)}{P(Context)}$$

Which is made up of:
P(Context|App) = P(< signals >)
P(Context|App) = P(signal_1|app) · P(signal_2|app) · P(signal_3|app) · P(signal_4|app)

$$P(signal_i \mid app) = \frac{v(signal_i \mid app)}{v(app)}$$

$$P(app) = \frac{v(app)}{v(any\ app)}$$

Although the disclosure may refer to the Bayes formula, it should be understood that the application ranking engine 138 may use other approaches to calculate the probability that an application will be accessed by the user in the current context. In implementations, the equations, operations, and/or functions to calculate the probability may be performed by one or more a server computers 160, 161 or some other computing device separate from the user's computing device 102. Although a single server computer may be referenced herein, it is understood that a plurality of server computers can perform the functions of the single referenced server computer Thus, the application ranking engine 138 may be located on the server computer 160, or the functionality of the application ranking engine 138 may be split between the computing device 102 and the server computer 160. This may allow time-consuming, expensive, and/or complex calculations to be performed remotely from the user's computing device 102 (e.g., smartphone). Similarly, the context engine 136, and the functionality that it performs to determine different contexts, can exist on a remote server computer 160 or can be split between the computing device 102 and a remote server computer 160.

In some implementations, the server computer 160 may receive anonymized data representing user models 162 from a plurality of different computing devices 102, 104, etc. that are associated with different users. A context engine 164 on the server computer 160 can generate different generalized contexts based on the plurality of different user models 162, and an application ranking engine 166 on the server computer 160 may generate generalized probabilities that one or more applications 114 would be accessed or used when the computing device 102, 104 is in one of the determined contexts. Such generalized contexts and probabilities of application usage within a context may have the benefit of being determined based on more user data but may lack a desired specificity for application that a particular user may seek.

An individual computing device 102 may receive the data generated by the server computer 160 (e.g., data identifying different generalized contexts and rankings based on user models for a plurality of users) and may incorporate the data into its own application ranking system. In one implementation, the application ranking engine 138 may use a naïve Bayes formula in addition to other components, combining them according to a weighting system that may indicate different weights for the output of the naïve Bayes formula and/or other components.

The context-based rankings output by the application ranking engine 138 can be used to determine one or more icons representing the applications 114 for display on a page of a user interface presented on display 118. For example, on a smart phone that has limited area for displaying icons representing applications 114, a limited number of application icons can be displayed on a page of the display. Selection of the application icons for display on the page of the display can be based on context-dependent rankings. In some implementations, the application icons that are presented on a display page when the computing device 102 is in a particular context can be organized in a hierarchical manner depending on the ranking of the applications. For example, highest ranked applications can have their icons displayed at the top of the display page, and other icons can be displayed on the page in descending order of their ranking. As the ranking for an application changes over time (e.g., because a user invokes the application more or less during the context than previously), the ranking of the application within the context can change, which may affect the placement of the application icon within the hierarchical organization on the display page. In some implementations, even though the rankings of applications may change over time, applications for the top N ranked applications within the context can be displayed in the same positions on the display page. For example, if six application icons are displayed on the display page, icons for the six most highly ranked applications can be displayed on the display page in order that does not change, even if the relative ranking of the six most highly ranked applications changes.

In some implementations, after the application ranking engine 138 identifies a set and/or an ordered list of applications sorted by their determine context-dependent rankings, the application ranking engine may apply a weight and/or increase the ranking (e.g., add a boost) calculated for an application 114 based on whether the user has manually launched or accessed (e.g., via a user interface presented on the display 118 of the computing device 102) the application identified by the application ranking engine. For example, if the application ranking engine 138 determines that there is a high probability that the user may use a map application while in a vehicle (e.g., while the device 102 is determined to be in the "vehicle" context), and then the user manually launches or accesses the map application when its icon is presented on the display page, the application ranking engine 138 may add to the probability that the user will access the map application. This may provide a boost to the ranking of the map application which may cause the map application to be presented in the UI more often when the user is in a vehicle.

Similarly, the application ranking engine may also apply a weight and/or decrease the ranking calculated for an application if the application was presented to the user via the UI and the user did not manually launch or access the application via the application user interface (e.g., an application menu). For example, the application ranking engine may determine that there is a high probability that the user will access a messaging application when the user is at work (e.g., in the "work" context) and may present the messaging application to the user in the UI. However, if the user does not select the messaging application, the application ranking engine may decrease the ranking for the messaging application within the "work" context. This may cause the messaging application to be presented in the UI less often when the user is at work.

Because the application management engine 132 may track whether the user is accessing applications that have been identified as having high probabilities of being accessed (e.g., having high rankings, as determined by the application ranking engine 138), the application ranking engine 138 can adapt to changes in a user's preference of applications. For example, a computing device 102 may have multiple map applications. If the user starts using a different map application more frequently (than a first map application) while in a vehicle (e.g., when the computing devices determined to be in a "vehicle" context), the application ranking engine 138 may rank the different map application higher than the first application and may present the different application to the user instead of the first map application. In another example, if the user initially does not use a streaming music application while in a vehicle, but later starts to use the streaming music application while in a vehicle, this may cause the application ranking engine to rank the streaming music application higher and higher.

In some implementations, some or all of the functionality of the application management engine 132, the user models 134, the context engine 136, and the application ranking engine 138 can be provided within the operating system 112. In some implementations, some or all of the functionality of the application management engine 132, the user models 134, the context engine 136, and the application ranking engine 138 can be provided within an application 114 that is installed on the computing device 102.

In some implementations, the application ranking engine 138, in addition to ranking applications 114 that have been previously executed on the computing device, also can rank applications 168 that are available for installation and execution on the computing device 102 but that have not been already executed on the computing device. For example, applications 168 may exist in a database maintained by server 160, and user models 162 for other users may provide an indication of one or more contexts an application 168 is likely to be used in. An application 168 can be assigned a ranking by a global application ranking engine 166 to indicate the probability of the application 168 being used in one or more particular contexts by a generalized user. Then, the application ranking engine 138, in coordination with the global application ranking engine 166, may assign a context-based ranking to the application 168 that has not been previously executed on the computing device 102. If the ranking is high enough, the application 168 can be recommended to a user, for example, through a user interface 140 that is presented on display 118 of computing device 102. In this manner, applications 168 of which a user of computing device 102 may be unaware can be recommended to the user at appropriate times or in appropriate contexts.

For example, a user may live and work in San Francisco, but when the user travels to Munich, Germany in late September or early October, applications 168 that provide information about the annual Oktoberfest Festival in Munich, Germany, that provide information about the Munich mass transit system, that provide information about restaurants and tourist attractions in Munich, etc. may be recommended to the user when the user's plane lands in Munich. In addition, when the user lands in Munich and the computing device 102 connects to wifi and cell tower base stations located in the Munich that the application has never seen, the context engine 136 may use this information to determine a new context for the user. Based on the existence of the "Munich" context, a request may be sent to server 160 for recommendations of application that would be useful to a first-time visitor to Munich. When the global application ranking engine 166 on the server 160 checks in its database for apps that are used by other devices frequently connected to Munich wifi and cell tower signals, it can find and recommend application such as local transit and restaurant apps that are actually used by other people in Munich.

In one implementation, applications may be identified that the user is likely access using different criteria when the application ranking engine does not have a sufficient history of application accesses. For example, when one or more modules, engines, applications, etc. that provide context-based ranking of applications and display context-based user interfaces to application icons is first installed on the computing device, a history of application accesses and/or the signals with which the application accesses are correlated may not exist. In this case, the application ranking engine may identify applications to present to the user on the UI (e.g., on the "lock screen" or the "home screen") by analyzing the organization of the applications on the computing device's home screens. For example, applications that are on a main or home screen may be the most frequently used applications. If the user has created shortcuts to certain applications, these applications may be identified and presented to the user on the UI. The application ranking engine may also identify applications that are located in the "dock" of the computing device (e.g., applications that are located in a main menu bar and that are always presented to the user regardless of which home screen the user is viewing). In one implementation, the application ranking engine 138 may identify a default set of applications for different contexts and may present application icons for the default set of applications on the UI. For example, the application ranking engine may determine that in the "work context" the top applications to present may be a calendar application, a file sharing application, an email application, etc. This information may be received from the server 160 (via the communication network 150) and/or may be stored locally in a memory or data store 110.

Figure 2A:
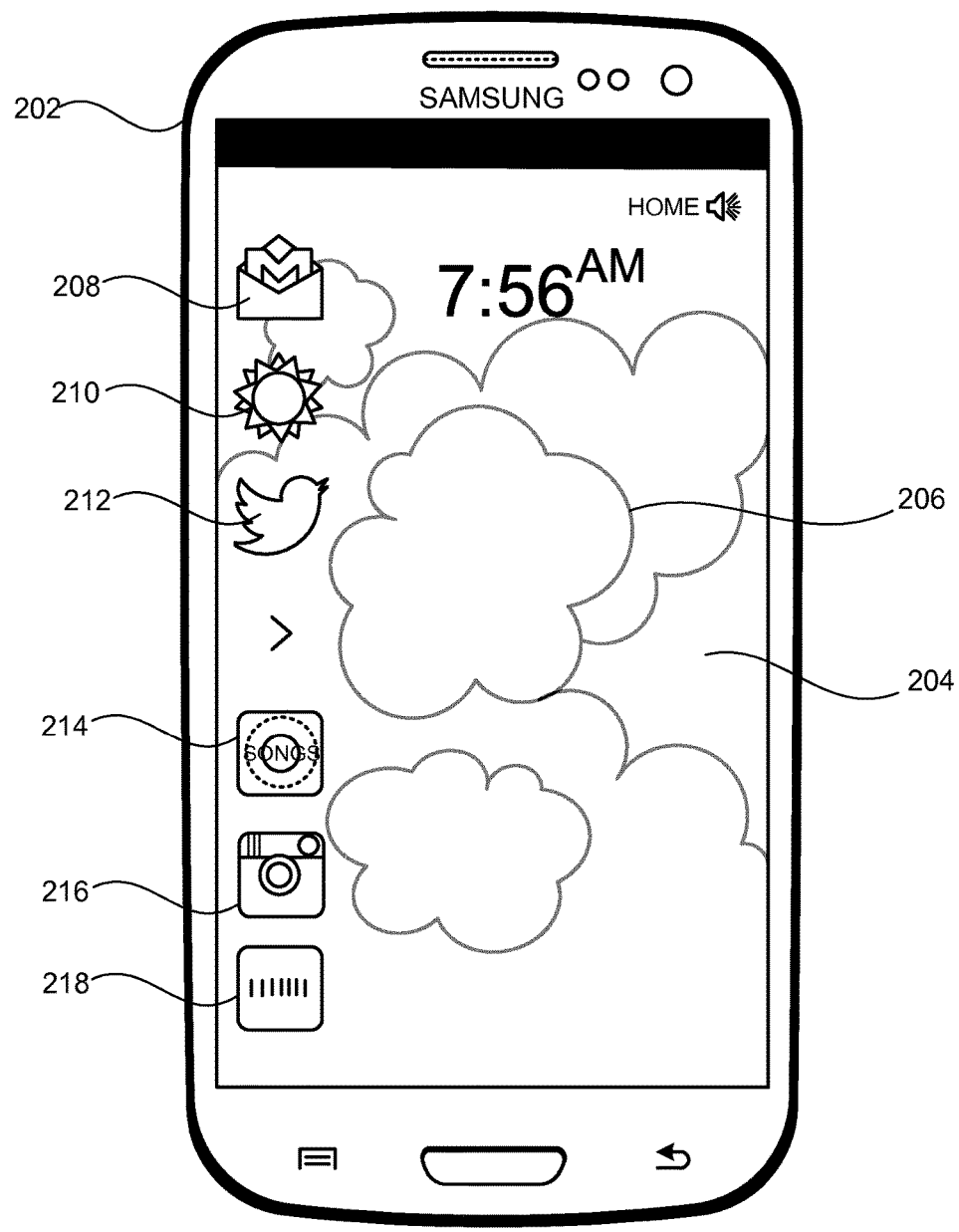
FIGS. 2A, 2B, and 2C are schematic diagrams illustrating graphical user interfaces (UIs) in which application icons are displayed on a device, in which the displayed icons are selected based on the context of the device.
Figure 2B:
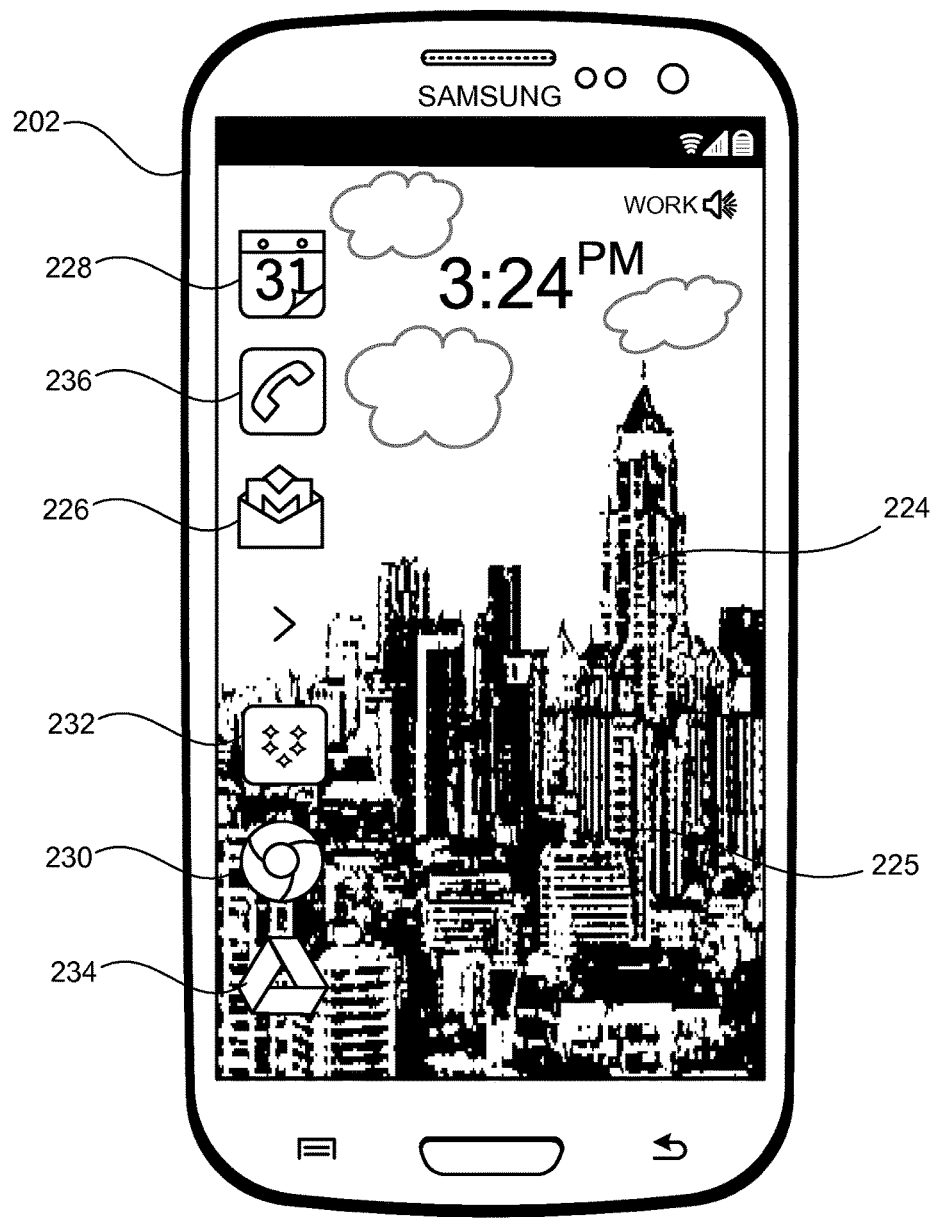
Figure 2C:
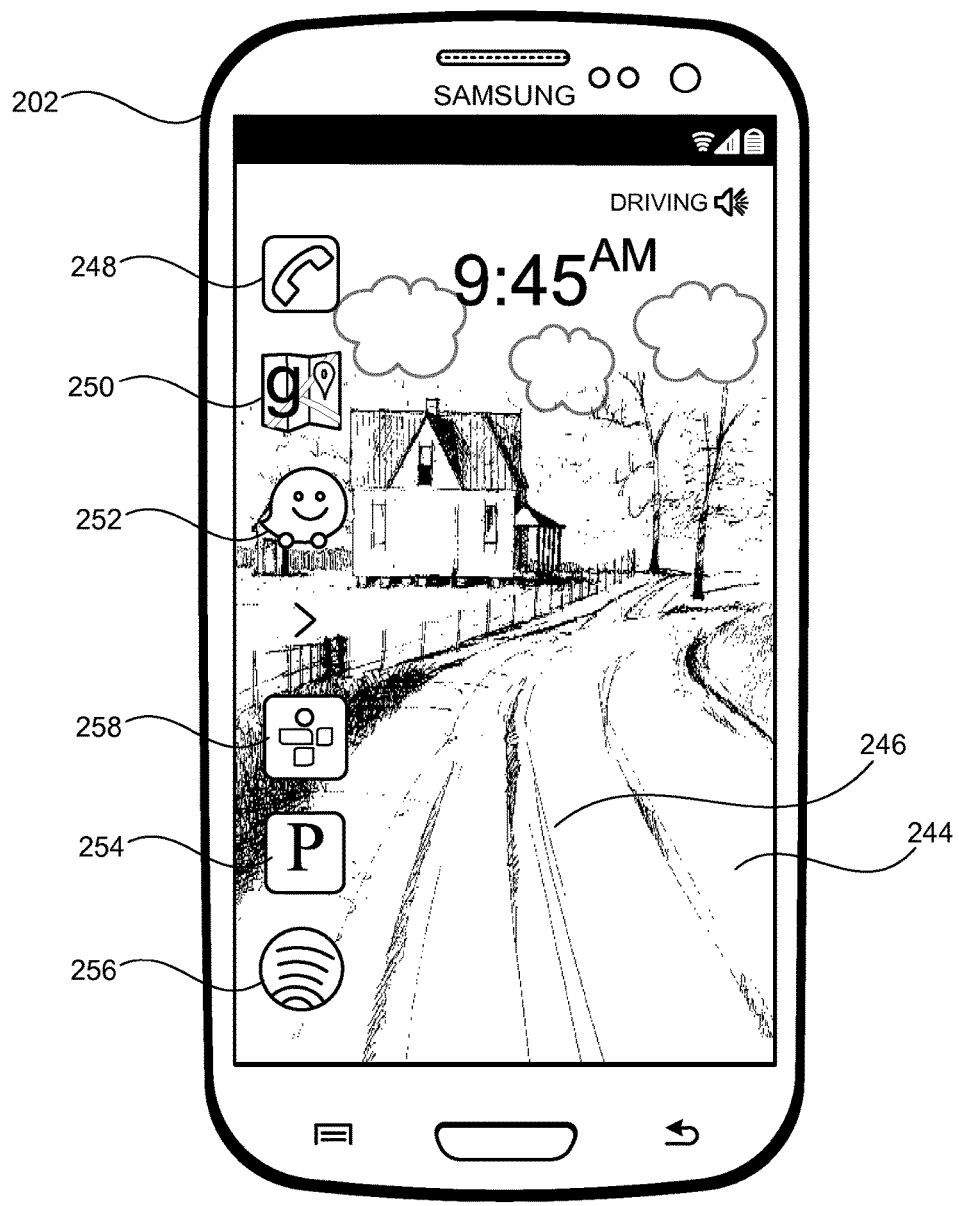

As discussed above, applications 114 that are identified by the application ranking engine 138 as being especially relevant in a particular context (e.g., the applications that have been ranked with high probabilities of being accessed when the computing device 102 is determined to be in the particular context) may be presented to the user on the lock screen of the computing device (as illustrated in FIG. 2A, FIG. 2B, and FIG. 2C). In another implementation, the applications may be presented to the user in a list format. In a further implementation, the applications may be presented to the user on an accessory device (e.g., a watch, glasses, or some other wearable computing device) 170 that is communicatively coupled to the computing device 102 that may be used to interact with the computing device 102.

Some applications 114 that are identified by the application ranking engine 138 as being especially relevant in a particular context and that are presented to a user on the user interface 140 on the display 118 of the computing device 102 are applications that can provide notifications of incoming communications received within the application. For example, an email application can provide a notification of a certain number of new, unread email messages. The text messaging application can provide a notification of a certain number of new, unread text messages. A telephone application can provide a notification of a certain number of new, unreviewed voicemail messages. And blog and social network applications can provide notifications of a number of new, unreviewed messages. The notification of a number of new messages associated with the application can be displayed within the user interface 140 in association with the application icon for the application. For example, when three unread email messages exist, the number "3" can be displayed in close association with the application icon for the email application.

In some implementations, the number of new messages, communications, events, etc. associated with an application that is displayed in the user interface can be throttled depending on the context of the computing device 102. For example, an application 114 can communicate with the context engine 136 to determine the existing context of the computing device 102, and, based on the context, the application can determine a context-dependent threshold level for the importance of messages, communications, events, etc. that are provided within the application. For example, if the user model 134 indicates that a user is very likely to respond to a notification provided by first application (e.g., a professional social network application) while the computing device 102 is in a "work" context, but is relatively unlikely to respond to a notification provided by a second application (e.g., a social network blogging application) while the computing device 102 is in the "work" context, then the threshold for notifications in the professional social network application can be adjusted to a low value while the threshold for notifications in the social network blogging application can be adjusted to a high value while the devices in the "work" context. Then, based on the context-dependent thresholds, relatively more notifications may be provided in the first application relatively few notifications may be provided in the second application while the computing device 102 is in the "work" context.

A contact database 142 may maintain information about people who are relevant to the user of the computing device, along with contact, and other identifying, information for the people. In some implementations, the user model 134 can model not only the user's context-dependent interactions with different applications 114 but also the user's context-dependent interactions with different people in the contact database 142. Similarly, the context engine 136 may determine different contexts based not only on the user's context-dependent interactions with different applications 114 but also the user's context-dependent interactions with different people in the contact database 142. The application ranking engine 138 may also rank the relevance of different contexts in the contact database based on the context of the computing device 102. When a contact with a high relevance in a particular context sends a message to a user of the computing device 102 through a particular application 114, the message from the contact, or at least a portion of the message, may be displayed in association with the application in the user interface 140 that is presented in the display 118. Then, the user may select the message from the user interface 140 for playback or to respond to the message from the contact.

In another implementation, an icon for a contact that is highly ranked in a particular context can be displayed in the user interface 140 that is presented on the display 118. In some implementations, the icon for the contact can be selected to access or invoke one or more applications 114 that may be used to indicate with the contact. In another implementation, icons for one or more applications that may be used to communicate with the contact can be displayed in association with the icon for the contact, without needing to select the icon. In some patients, suggested messages that may be sent to the contact may be determined based on previous communications of the contact that are stored in the user model 134, and the suggested messages may be displayed in association with the applications in the user interface 140.

FIGS. 2A, 2B, and 2C are diagrams illustrating graphical user interfaces (UIs) in which application icons are displayed on a device and the displayed icons are selected based on the context of the device. As illustrated in FIGS. 2A, 2B, and 2C, the UIs display different icons associated with different applications for different c other ontexts. Examples of factors that may be considered when determining a context may include, but are not limited a time (e.g., 5:00 PM), a date (e.g., Sunday, Sep. 1, 2013), a location of the computing device, an activity of the user, sensor data received from various sensors that may be present in the computing device (e.g., temperature, humidity, acceleration of the computing device, orientation of the computing device, etc.).

FIG. 2A is a schematic diagram of a computing device 202 that is displaying a graphical user interface 204 that indicates the computing devices in a first context, which corresponds to use of the computing device at home. The computing device 202 can be equivalent to computing device 102. When the computing device 202 is in this first context, the context engine 136 may determine that the computing device 202 is currently being used at the user's home. Based on this context, the application ranking system may identify applications that the user is likely to access using the computing device.

For example, when the user is at home, the application ranking engine 138 may determine that the user may be likely to access an email application, a weather application (to check the weather in different locations), a blogging application, a streaming video application (to watch streaming videos), a streaming music application (to listen to streaming music), a camera application (to take pictures and videos), etc. As illustrated in FIG. 2A, the user interface 204 may present a background image 206 that indicates the "home" context and icons for the email application 208, the weather application 210, the blogging application 212, the streaming music application 214, the camera application 216, and the video streaming application 218, because these are applications that the user may often access when the user is at home. This allows the user to more quickly and easily access applications that the user is likely to use.

The applications corresponding to application icons 208, 210, 214, 212, 216, and 218 may be the most highly ranked applications for the user within the home context. The application icons may be organized on the user interface 204 according to their ranking. For example, the most highly ranked application may have its application icon 208 displayed in the top left portion of the user interface 204, and other application icons may be presented in descending order according to their ranking below icon 208.

FIG. 2B is a schematic diagram of a computing device 202 that is displaying a graphical user interface 224 that indicates the computing devices in a second context, which corresponds to use of the computing device while the user is at work. When the computing device 202 is in this second context, the context engine 136 may determine that the computing device 202 is currently being used while the user is at work. The determination of this "work" context can be based on a variety of signals. For example, one signal may include a location of the computing device 202 (i.e., that the computing device is located at the user's workplace). Another signal may indicate that the computing device being used at a particular time on a weekday, even if the device is being used at a location that corresponds to the user's home (e.g., if the user generally works from home but is focused on work tasks during particular hours of a weekday).

Based on this context, the application ranking engine may identify applications that the user is likely to access using the computing device. For example, when the user is at work, the user may be likely to access an email application, a calendar application (to check tasks and appointments), a browser application (e.g., to browse websites on the internet), a file sharing application (e.g., to share different files with different people), a phone application (to make and receive phone calls), an online document management application, etc.

As illustrated in FIG. 2B, the UI 224 may present a background image 225 that indicates the "work" context. The UI 224 may present icons for the email application 226, the calendar application 228, the browser application 230, the file sharing application 232, the online document management application 234, and the phone application 236 because these are applications that the user may often access when the user is at work.

FIG. 2C is a schematic diagram of a computing device 202 that is displaying a graphical user interface 244 that indicates the computing devices in a third context, which corresponds to use of the computing device while the user is driving in a vehicle (e.g., a car). The context engine 136 may determine that the computing device 202 is being used in the "driving" context based on a variety of signals, which may include, for example, input from the accelerometer 122 indicating that the computing device is in motion at a speed of more than 15 mph, input from the Bluetooth interface 130 indicating that the computing device 202 is paired with a Bluetooth interface on a car, etc. While the computing device 202 is used in the "driving" context, the application ranking engine 138 may determine that the user is likely to access a phone application, a map application (to get directions to different locations), a traffic application (e.g., to view traffic for different locations), one or more streaming music applications, a podcast application, etc.

As illustrated in FIG. 2C, the UI 244 may present a background image 246 that indicates the "work" context. The UI 244 may present icons for the phone application 248, the map application 250, the traffic application 252, a first music streaming application 254, a second music streaming application 256, a podcast application 258 etc., because these are applications that the user may often access when the user is in a vehicle or in a car.

Figure 3A:
FIGS. 3A, 3B, and 3C are schematic diagrams illustrating graphical user interfaces (UIs) in which icons are displayed on a device, in which the displayed icons are selected based on the context of the device.
Figure 3B:
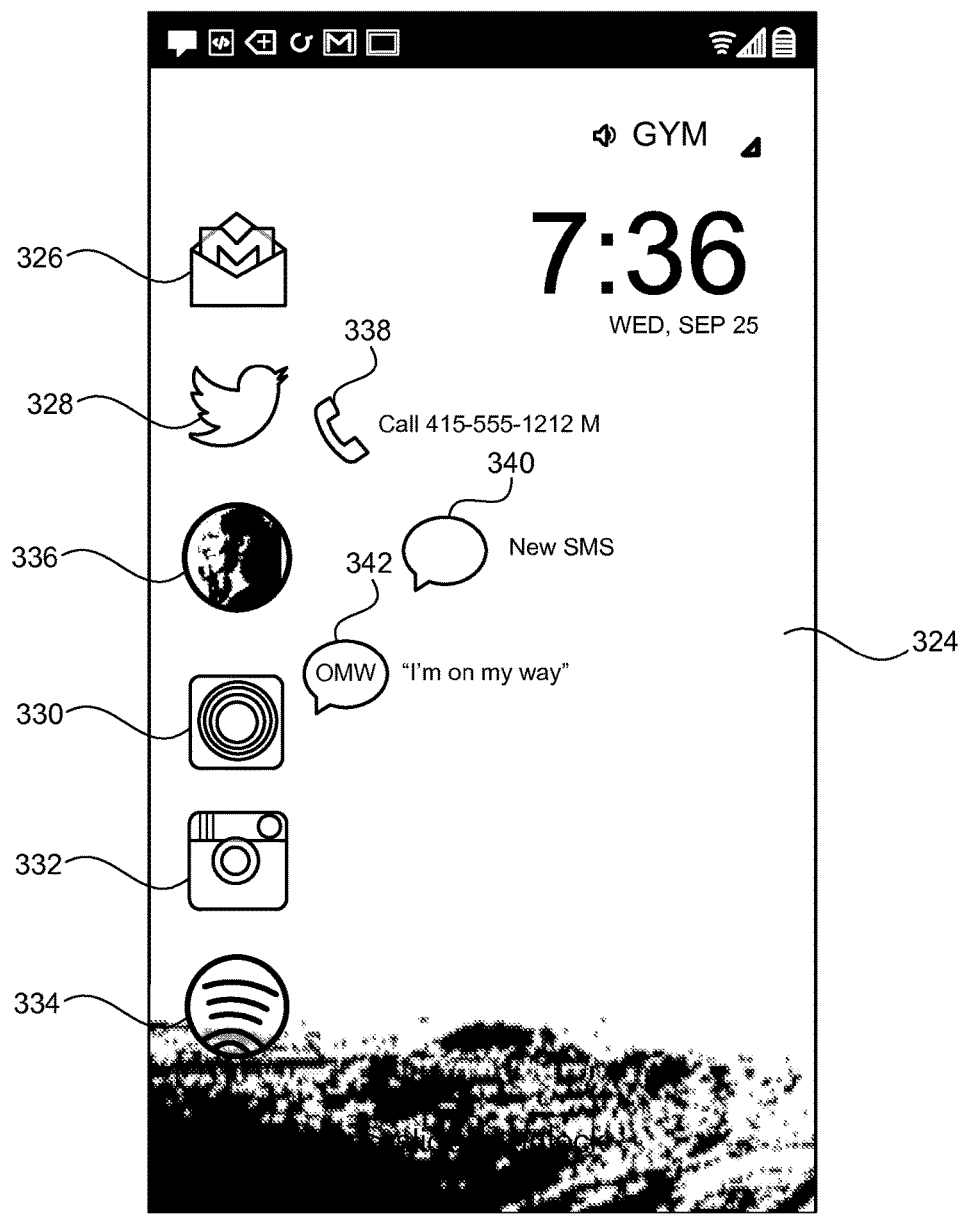
Figure 3C:
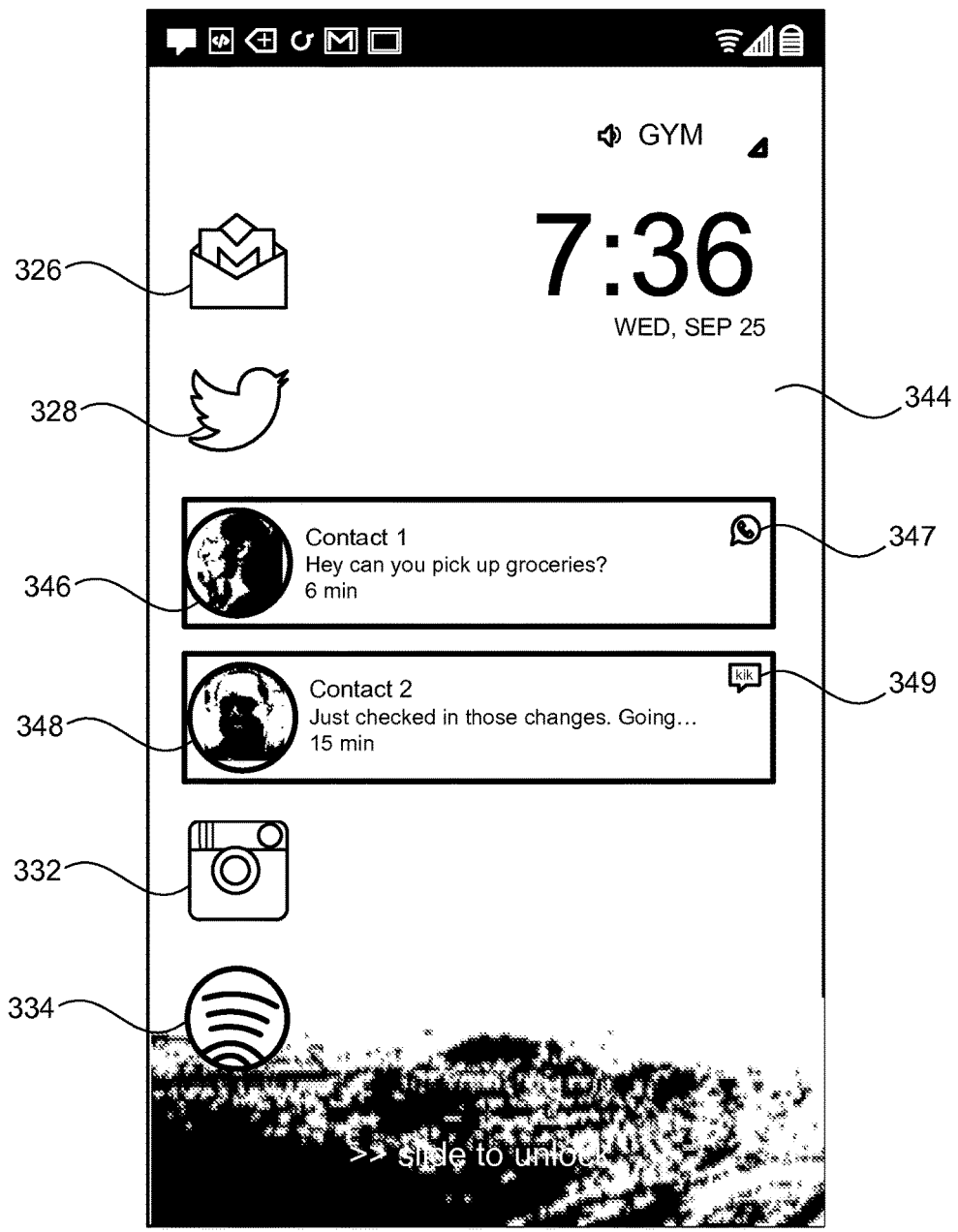

FIGS. 3A, 3B, and 3C are schematic diagrams illustrating graphical user interfaces (UIs) in which icons are displayed on a device in the displayed icons are selected based on the context of the device.

FIG. 3A is a schematic diagram of a graphical user interface 304 that indicates the computing devices in a home context, in which context-dependent application icons 306, 308, 310, 312, 314, 316 displayed within the user interface 304. The application icons may be selected for display within the user interface based on having a high ranking within the home context. Application icon 314 may correspond to an application that provides an interface to an online marketplace for additional applications and content (e.g., games, music, videos, productivity applications, etc.) and it allows a user to download and install applications and content from the marketplace. And notification icon 318 may be displayed in association with application icon 314 to indicate existence of pending messages, notifications, or events that exist within the application that corresponds to icon 314. For example, a "3" and notification icon 318 may indicate that a user has received three new suggestions of applications or content that may be downloaded to the computing device 102 to that displays the user interface 304. The number of notifications provided within the notification icon 318 for a particular application may depend on the context of the computing device 102 that is displaying the user interface 304. For example, the threshold for providing notifications about events in the online marketplace application that is represented by icon 314 may be low when the device is in the "home" context but may be high when the devices in the work context, so that the user is not bothered by such notifications while at work but receives the notifications at a time when he or she is more likely to respond to the notifications.

FIG. 3B is a schematic diagram of a graphical user interface 324 that indicates the computing devices in a "Gym" context, where the gym context may exist because a user of the computing device 102 to frequently goes to a gym at a regular time after work and before returning home. In the gym context, context-dependent application icons 326, 328, 330, 332, and 334 are displayed within the user interface 324. The application icons may be selected for display within the user interface based on having a high ranking within the Gym context. In addition to the application icons, a contact icon 336 representing a contact and contact database 142 can be displayed in the user interface. The contact whose contact icon 336 is displayed can be ranked highly by the application ranking engine 138 based on a user model that includes a history of messages to, or interactions with the contact when the computing device 102 is in the gym context, especially at the end of the time period that corresponds to the gym context.

In association with the user icon 336, icons 338, 340, and 342 can be displayed. Icon 338 corresponds to a phone application, and in association with the icon 338 a suggested action (i.e., "call 415-555-1212 M") can be displayed. Selecting the icon 338 or selecting the suggested action can invoke the phone application and/or can automatically call the phone number listed in the suggested action. Icons 340 and 342 can correspond to a text messaging application. In association with icon 342 a suggested message, "I'm on my way" can be displayed. Selecting the icon 342 or the suggested message can invoke the text messaging application to automatically send the suggested message to the contact. Selecting the icon 340 can invoke the text messaging application to send a text message to the contact and may prompt the user to enter the content of the message and then to send the message.

FIG. 3B is a schematic diagram of another graphical user interface 344 that indicates the computing devices in a "Gym" context. In addition to application icons 326, 328, 332, 334, contact icons 346 and 348 representing the first and second contact, respectively from the contact database 142 can be displayed in the user interface. The contacts whose contact icons 346, 348 are displayed can be ranked highly by the application ranking engine 138 based on a user model that includes a history of messages to, or interactions with the contacts when the computing device 102 is in the gym context, especially at the end of the time period that corresponds to the gym context. As shown in FIG. 3B, the contact icon 346 can be displayed in association with an icon 347 representing a phone application and a message, "Hey can you pick up groceries?", which may be a transcription of a voicemail message received six minutes previously from Contact 1 through the phone application. The contact icon 348 can be displayed in association with an icon 349 presenting a text message application and a message, "Just checked in those changes. Going . . . ", corresponding to a text message received 15 minutes previously from Contact 2 through the text messaging application. Other phone and text messages from other contacts may not be displayed in the user interface 344 if the ranking of the other contacts is not high enough for icons representing those contacts to be placed in the user interface when the computing device 102 to within the gym context.

Figure 4:
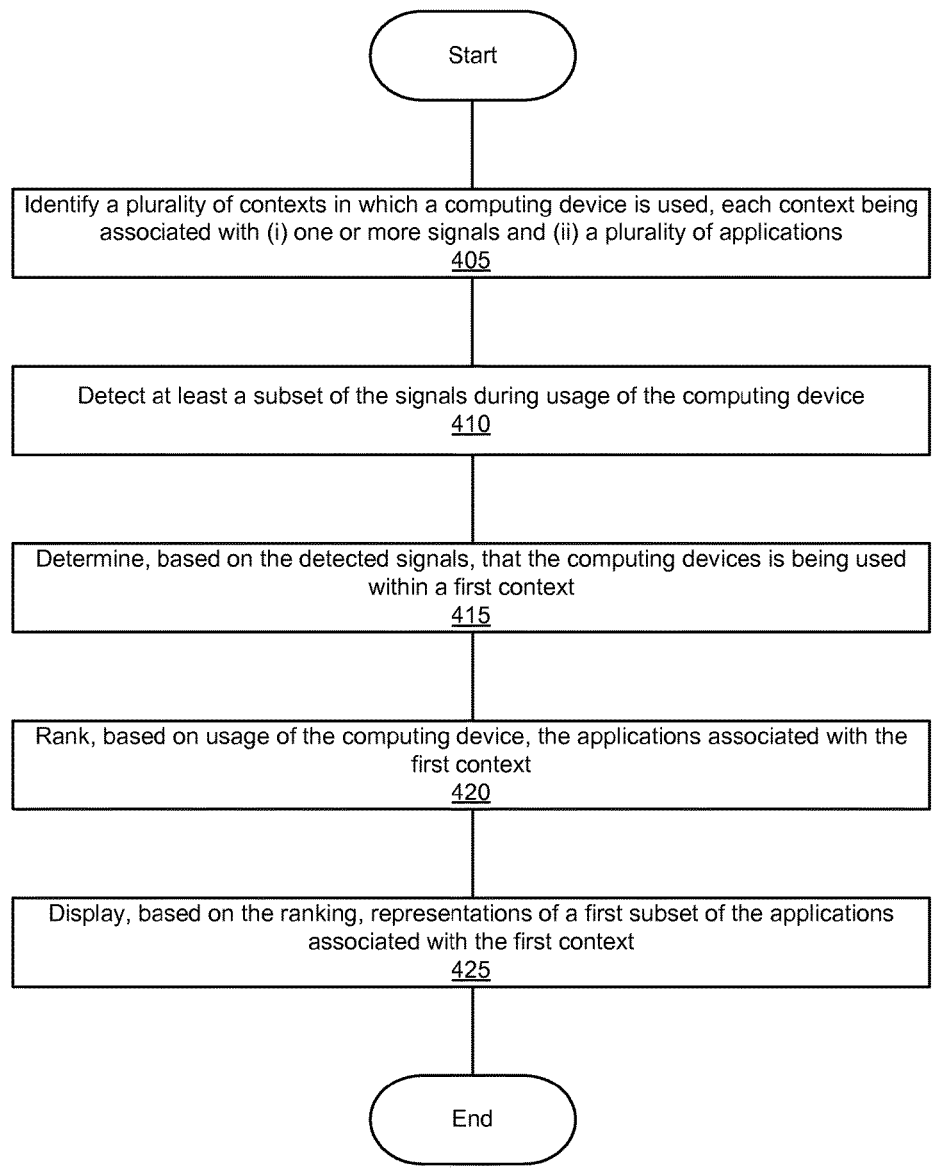
FIG. 4 is a flow chart illustrating a method of ranking applications.

FIG. 4 is a flow chart illustrating a method of ranking applications. For simplicity of explanation, the method illustrated in FIG. 4 is depicted and described as a series of acts. However, acts in accordance with this disclosure can occur in various orders and/or concurrently and with other acts not presented and described herein. Furthermore, not all illustrated acts may be required to implement the methods in accordance with the disclosed subject matter. In addition, those skilled in the art will understand and appreciate that the methods disclosed herein could alternatively be represented as a series of interrelated states via a state diagram or events. The method may be performed by processing logic that comprises hardware (e.g., circuitry, dedicated logic, programmable logic, microcode, etc.), software (e.g., instructions run on a processor to perform hardware simulation), or a combination thereof.

The method of FIG. 4 includes, at block 405 identifying a plurality of contexts in which the computing device is used, each context being associated with (i) one or more signals and (ii) a plurality of applications. At block 410, the method includes detecting at least a subset of the signals during usage of the computing device. At block 415, the method includes determining, based on the detected signals, that the computing devices is being used within a first context. At block 420, the method includes ranking, based on usage of the computing device, the applications associated with the first context. At block 425, the method includes displaying, based on the ranking, representations of a first subset of the applications associated with the first context on a display of the computing device. In other embodiments, a method can include other operations and features, such as those described herein with respect to FIGS. 1-3C and 5.

Figure 5:
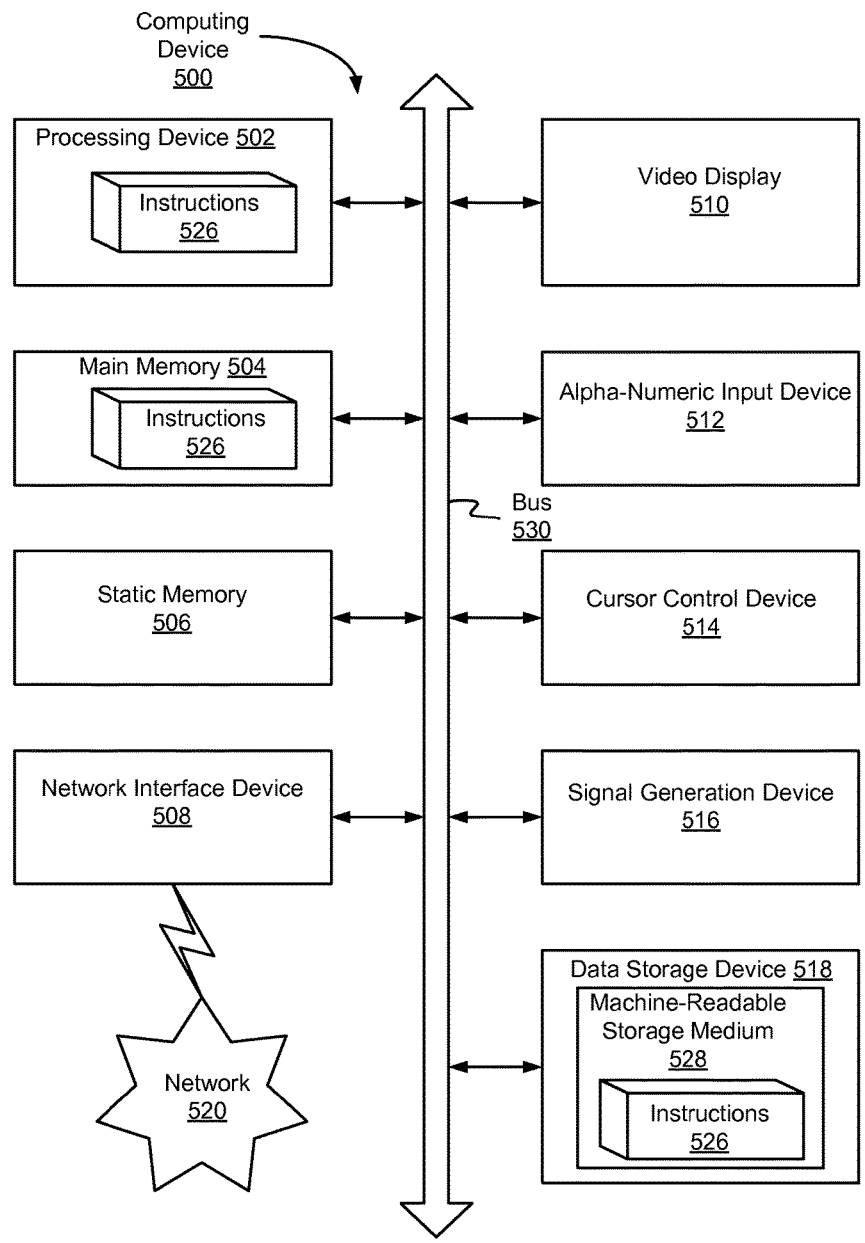
FIG. 5 shows an example of a computer device and a mobile computer device that can be used to implement the techniques described here.

FIG. 5 illustrates a diagrammatic representation of a machine in the example form of a computing device 500 within which a set of instructions, for causing the machine to perform any one or more of the methodologies discussed herein, may be executed. The computing device 500 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In one implementation, the computing device 500 may present an overlay UI to a user (as discussed above). In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 500 includes a processing device (e.g., a processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)) and a data storage device 518, which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 526 (e.g., instructions for an application ranking system) for performing the operations and steps discussed herein.

The computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and a signal generation device 516 (e.g., a speaker). In one implementation, the video display unit 510, the alphanumeric input device 512, and the cursor control device 514 may be combined into a single component or device (e.g., an LCD touch screen).

The data storage device 518 may include a computer-readable storage medium 528 on which is stored one or more sets of instructions 526 (e.g., instructions for the application ranking system) embodying any one or more of the methodologies or functions described herein. The instructions 526 may also reside, completely or at least partially, within the main memory 504 and/or within the processing device 502 during execution thereof by the computing device 500, the main memory 504 and the processing device 502 also constituting computer-readable media. The instructions may further be transmitted or received over a network 520 via the network interface device 508.

While the computer-readable storage medium 528 is shown in an example implementation to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that implementations of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "calculating," "updating," "transmitting," "receiving," "generating," "changing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method of managing a display of applications on a mobile computing device, the method comprising:
    determining, based at least in part on information about when different applications that exist on the mobile computing device and that have been executed by the mobile computing device are used on the mobile computing device by a user of the mobile computing device, a plurality of contexts specific to the user in which the mobile computing device is used, each context being associated with (i) one or more signals indicating how the device is used or a state of the device and (ii) a plurality of the applications;
    detecting at least a subset of the signals during usage of the mobile computing device by the user;
    determining, based at least in part on the detected signals, that the computing device is being used by the user within a first context;
    ranking applications associated with the first context specific to the user, wherein the applications exist on the mobile computing device and have been executed by the mobile computing device and wherein the ranking of the applications is based on the determination that the mobile computing device is being used by the user in the first context;
    displaying, based at least in part on the ranking, representations of a first subset of the ranked applications associated with the first context specific to the user on a display of the mobile computing device;
    determining, based at least in part on the detected signals, that that the mobile computing device is being used within a second context specific to the user;
    ranking applications associated with the second context, wherein the applications exist on the mobile computing device and have been executed by the mobile computing device, and wherein the ranking of the applications is based at least in part on the determination that the mobile computing device is being used by the user in the second context; and
    displaying, based at least in part on the ranking, representations of a second subset of the applications associated with the second context specific to the user on the display of the mobile computing device.

2. The method of claim 1, wherein the plurality of signals includes a determined location of the mobile computing device when it is used by the user.

3. The method of claim 1, wherein the one or more signals includes a time at which the mobile computing device is used by the user.

4. The method of claim 1, wherein the one or more signals includes an indication of another device to which the mobile computing device is functionally connected.

5. The method of claim 1, wherein determining the plurality of contexts includes correlating usage of applications on the mobile computing device with the individual signals to generate a user model associated with the user of the mobile computing device, and wherein the plurality of contexts are based at least in part on the user model.

6. The method of claim 1, further comprising:
    receiving from the user an input specifying a number of contexts; and
    wherein determining the plurality of contexts includes determining a number of the contexts and wherein the number of contexts is determined based at least in part on the input from the user.

7. The method of claim 1, further comprising:
    ranking an application that has not been used previously on the mobile computing device, wherein the ranking is based at least in part on a relevance to the user, when the mobile computing device is being used within the first context, of the application that has not been used previously on the mobile computing device, and wherein, based at least in part on the ranking, the application is associated with the first context specific to the user, and wherein the display of the representations of the first subset of the applications includes a representation of the application that has not been used previously.

8. The method of claim 1, further comprising changing the rankings of the applications based at least in part on how long the mobile computing device has been used within the first context.

9. The method of claim 1, wherein the ranking of the applications remains fixed while the mobile computing device is used within the first context.

10. The method of claim 1, wherein displaying the representations of the first subset of the applications includes displaying, in association with a representation of one of the displayed applications, a notification of a number of new events associated with the application.

11. The method of claim 10, further comprising determining a threshold for new events to be associated with the application, wherein the determination of the threshold is based at least in part on the determination that the mobile computing device is being used the first context.

12. The method of claim 1, further comprising:
based at least in part on the determination that the mobile computing device is being used within the first context, selecting a contact of the user of the mobile computing device for association with a displayed representation of an application; and
displaying a representation of the contact in association with the representation of the application.

13. The method of claim 12, further comprising:
based at least in part on the determination that the mobile computing device is being used within the first context, pre-populating a suggested action for the application whose representation is displayed in association with the representation of the contact.

14. The method of claim 1, wherein determining the plurality of contexts is performed by the execution of software running on the mobile computing device and wherein ranking applications associated with the first context specific to the user is performed by the execution of software running on the mobile computing device.

15. The method of claim 1, wherein the plurality of contexts specific to the user in which the mobile computing device is used include a home context, a work context, and a driving context.

16. A mobile computing device comprising:
a computer processor;
a context engine executing on the computer processor and configured to:
detect one or more signals indicating how the device is used or a state of the device as the mobile computing device is used;
determine, based at least in part on information about when different applications are used on the mobile computing device by a user of the mobile computing device when different applications are used on the mobile computing device, a first usage context and a second usage context, each usage context being specific to the user, each context being associated with (i) one or more of the signals and (ii) a plurality of applications;
a ranking engine executing on the computer processor and configured to rank a plurality of applications within the first usage context specific to the user and to rank a plurality of applications within the second usage context specific to the user, wherein the ranked applications within each usage context exist on the mobile computing device and have been executed by the mobile computing device; and
a display configured to display, based at least in part on the ranking, a representation of at least a subset of the applications ranked in the first usage context and to display, based at least in part on the ranking, a representation of at least a subset of the applications ranked in the second usage context.

17. The mobile computing device of claim 16, wherein determining the plurality of contexts specific to the user includes determining a number of contexts specific to the user and wherein the number of contexts is determined based at least in part on input from the user about the number of contexts to determine.

18. The mobile computing device of claim 16,
wherein the context engine is further configured to, based at least in part on the determination that the mobile computing device is being used within the first context, select a contact of the user of the mobile computing device for association with a displayed representation of an application, and
wherein the display is configured to display a representation of the contact in association with the representation of the application.

19. The mobile computing device of claim 18, wherein the context engine is further configured to, based at least in part on the determination that the mobile computing device is being used within the first context, pre-populate an input to a suggested action for the application whose representation is displayed in association with the representation of the contact.

20. The mobile computing device of claim 16, wherein determining the plurality of contexts includes correlating usage of applications on the mobile computing device with the individual signals to generate a user model associated with the user of the mobile computing device, and determining the plurality of contexts based at least in part on the user model.

21. The mobile computing device of claim 16, wherein displaying the representations of the first subset of the applications includes displaying, in association with a representation of one of the displayed applications, a notification of a number of new events associated with the application.

22. A non-transitory computer-readable storage medium including instructions for managing a display of applications on a mobile computing device and that, when executed, cause a system to:
determine, based at least in part on information about when different applications that exist on the mobile computing device and that have been executed by the mobile computing device are used on the mobile computing device by a user of the mobile computing device, a plurality of contexts specific to the user in which the mobile computing device is used, each context being associated with (i) one or more signals indicating how the device is used or a state of the device and (ii) a plurality of the applications;
detect at least a subset of the signals during usage of the mobile computing device by the user;
determine, based at least in part on the detected signals, that the computing device is being used by the user within a first context;
rank applications associated with the first context specific to the user, wherein the applications exist on the mobile computing device and have been executed by the mobile computing device and wherein the ranking of the applications is based on the determination that the mobile computing device is being used by the user in the first context;

display, based at least in part on the ranking, representations of a first subset of the ranked applications associated with the first context specific to the user on a display of the mobile computing device;

determine, based at least in part on the detected signals, that that the mobile computing device is being used within a second context specific to the user;

rank applications associated with the second context, wherein the applications exist on the mobile computing device and have been executed by the mobile computing device, and wherein the ranking of the applications is based at least in part on the determination that the mobile computing device is being used by the user in the second context; and display, based at least in part on the ranking, representations of a second subset of the applications associated with the second context specific to the user on the display of the mobile computing device.

23. The non-transitory computer-readable storage medium claim 22, wherein the plurality of signals includes a determined location of the mobile computing device when it is used by the user.

24. The non-transitory computer-readable storage medium claim 22, wherein the one or more signals includes a time at which the mobile computing device is used by the user.

25. The non-transitory computer-readable storage medium claim 22, wherein the one or more signals includes an indication of another device to which the mobile computing device is functionally connected.

26. The non-transitory computer-readable storage medium claim 22, wherein determining the plurality of contexts includes correlating usage of applications on the mobile computing device with the individual signals to generate a user model associated with the user of the mobile computing device, and wherein the plurality of contexts are based at least in part on the user model.

27. The non-transitory computer-readable storage medium claim 22, wherein the instructions, when executed, further cause the system to:
receive from the user an input specifying a number of contexts; and
wherein determining the plurality of contexts includes determining a number of the contexts and wherein the number of contexts is determined based at least in part on the input from the user.

28. The non-transitory computer-readable storage medium claim 22, wherein the instructions, when executed, further cause the system to:
rank an application that has not been used previously on the mobile computing device, wherein the ranking is based at least in part on a relevance to the user, when the mobile computing device is being used within the first context, of the application that has not been used previously on the mobile computing device, and wherein, based at least in part on the ranking, the application is associated with the first context specific to the user, and
wherein the display of the representations of the first subset of the applications includes a representation of the application that has not been used previously.

29. The non-transitory computer-readable storage medium claim 22, wherein the instructions, when executed, further cause the system to:
change the rankings of the applications based at least in part on how long the mobile computing device has been used within the first context.

30. The non-transitory computer-readable storage medium claim 22, wherein the ranking of the applications remains fixed while the mobile computing device is used within the first context.

31. The non-transitory computer-readable storage medium claim 22, wherein displaying the representations of the first subset of the applications includes displaying, in association with a representation of one of the displayed applications, a notification of a number of new events associated with the application.

32. The non-transitory computer-readable storage medium claim 31, wherein the instructions, when executed, further cause the system to:
determine a threshold for new events to be associated with the application, wherein the determination of the threshold is based at least in part on the determination that the mobile computing device is being used the first context.

33. The non-transitory computer-readable storage medium claim 22, wherein the instructions, when executed, further cause the system to:
based at least in part on the determination that the mobile computing device is being used within the first context, select a contact of the user of the mobile computing device for association with a displayed representation of an application; and
display a representation of the contact in association with the representation of the application.

34. The non-transitory computer-readable storage medium claim 33, wherein the instructions, when executed, further cause the system to:
based at least in part on the determination that the mobile computing device is being used within the first context, pre-populate a suggested action for the application whose representation is displayed in association with the representation of the contact.

35. The non-transitory computer-readable storage medium claim 22, wherein determining the plurality of contexts is performed by the execution of software running on the mobile computing device and wherein ranking applications associated with the first context specific to the user is performed by the execution of software running on the mobile computing device.

36. The non-transitory computer-readable storage medium claim 22, wherein the plurality of contexts specific to the user in which the mobile computing device is used include a home context, a work context, and a driving context.

* * * * *